United States Patent
Takikawa

(10) Patent No.: US 9,020,566 B2
(45) Date of Patent: Apr. 28, 2015

(54) VEHICLE ON-BOARD UNIT AND MOBILE DEVICE LINKAGE SYSTEM

(71) Applicant: Honda Access Corp., Niiza-shi, Saitama (JP)

(72) Inventor: Keiichi Takikawa, Niiza (JP)

(73) Assignee: Honda Access Corp., Niiza-shi (JP)

( * ) Notice: Subject to any disclaimer, the term of this patent is extended or adjusted under 35 U.S.C. 154(b) by 239 days.

(21) Appl. No.: 13/662,614

(22) Filed: Oct. 29, 2012

(65) Prior Publication Data

US 2013/0137489 A1    May 30, 2013

(30) Foreign Application Priority Data

Nov. 30, 2011    (JP) .................................. 2011-262935

(51) Int. Cl.
| | |
|---|---|
| *H04B 1/38* | (2006.01) |
| *H04W 4/00* | (2009.01) |
| *H04W 4/04* | (2009.01) |

(52) U.S. Cl.
CPC .............. *H04W 4/001* (2013.01); *H04W 4/046* (2013.01)

(58) Field of Classification Search
None
See application file for complete search history.

(56) References Cited

U.S. PATENT DOCUMENTS

| | | | |
|---|---|---|---|
| 2002/0177928 A1* | 11/2002 | Moriguchi et al. | ................ 701/1 |
| 2010/0048253 A1* | 2/2010 | Park et al. | ...................... 455/566 |
| 2010/0216509 A1* | 8/2010 | Riemer et al. | ................. 455/557 |

FOREIGN PATENT DOCUMENTS

| | | |
|---|---|---|
| JP | 2003-244343 A | 8/2003 |
| JP | 2004-233117 A | 8/2004 |
| JP | 2010-130670 A | 6/2010 |

OTHER PUBLICATIONS

Japanese Office Action dated Oct. 8, 2013, issued in corresponding Japanese Patent Application No. 2011-262935, w/ English translation.

* cited by examiner

*Primary Examiner* — Nay A Maung
*Assistant Examiner* — Alejandro Rivero
(74) *Attorney, Agent, or Firm* — Westerman, Hattori, Daniels & Adrian, LLP

(57) ABSTRACT

A system to link a mobile device with a vehicle on-board unit includes an interface section that allows communication between the mobile device and the on-board unit, a linkage determining section that, on the basis of information obtained by the interface section, determines whether or not the mobile device and the on-board unit are linked together, a vehicle travel determining section that determines whether or not the vehicle is in motion, an application start control section that starts a launcher application provided on the mobile device, the launcher application being configured to restrict use of a registered application of the mobile device while the vehicle is in motion, and an illumination control section that causes a screen of a display section of the mobile device turn off when the launcher application is started.

4 Claims, 3 Drawing Sheets

VEHICLE ON-BOARD UNIT AND MOBILE DEVICE LINKAGE SYSTEM

FIELD OF THE INVENTION

The present invention relates to a system that links a vehicle on-board unit and a mobile device.

BACKGROUND OF THE INVENTION

A system to link a vehicle on-board unit with a mobile device is disclosed, for example, in Japanese Patent Application Laid-open Publication (JP-A) No. 2003-244343. The disclosed system includes an on-board unit of a vehicle and a mobile phone, which can be linked together such that when the user operates a changeover switch of the mobile phone, the mobile phone is connected to the on-board unit whereupon a screen of the mobile phone is switched to a non-display state.

The mobile device such as mobile phone can be used with various applications, however, for some sort of applications, execution is not desirable while the vehicle is moving or in motion.

SUMMARY OF THE INVENTION

It is, therefore, an object of the present invention to provide a system to link a vehicle on-board unit with a mobile device without hindering safe driving the vehicle.

According to the present invention, there is provided a vehicle on-board unit and mobile device linkage system, comprising: an on-board unit installed in a vehicle; a mobile device having a display section; an interface section that allows communication between the mobile device and the on-board unit; a linkage determining section that, on the basis of information obtained by the interface section, determines whether or not the mobile device and the on-board unit are linked together; a vehicle travel determining section that determines whether or not the vehicle is in motion; an application start control section that starts a launcher application provided on the mobile device, the launcher application being configured to restrict use of a registered application provided on the mobile device while the vehicle is in motion; and an illumination control section that causes a screen of the display section of the mobile device turn off when the launcher application is started.

With this arrangement, since use of the registered application can be restricted by a linkage or cooperative application while the vehicle is moving or in motion, the icon or the like indication of such a registered application which is unusable while the vehicle is in motion is prevented from coining into driver's attention. The driver is allowed to concentrate on continued driving operation, which will lead to safe driving of the vehicle. Furthermore, since the screen of the display section of the mobile device is turned off when the launcher application is started, the driver is able to acknowledge the start-up of the launcher application without looking directly at the display section of the mobile device. This arrangement will assist the driver to concentrate on safe driving of the vehicle. Additionally, turn-off of the screen of the display section of the mobile device provides a corresponding reduction in heat generated from the mobile device, which will ensure stable operation of the mobile device.

In one preferred form of the present invention, the vehicle travel determining section uses information from a parking brake of the vehicle in order to determine whether or not the vehicle is in motion. By thus using information from the parking brake, the vehicle travel determining section can surely determine a moving state of the vehicle.

Preferably, the launcher application is an application capable of recognizing a voice-activation command from a driver of the vehicle. This arrangement allows the driver to activate the launcher application by voice and provides a substantive reduction in driving operation loads on the driver, leading to highly safe driving of the vehicle.

Preferably, the illumination control section operates to turn off the screen of the display section of the mobile device when the launcher application is started under conditions that a linkage between the mobile device and the on-board unit has been determined by the linkage determining section and the vehicle while in a moving state has been determined by the vehicle travel determining section.

BRIEF DESCRIPTION OF THE DRAWINGS

One preferred structural embodiment of the present invention will be described in detail herein below, by way of example only, with reference to the accompanying sheets of drawings, in which.

DESCRIPTION OF THE PREFERRED EMBODIMENT

Figure 1:
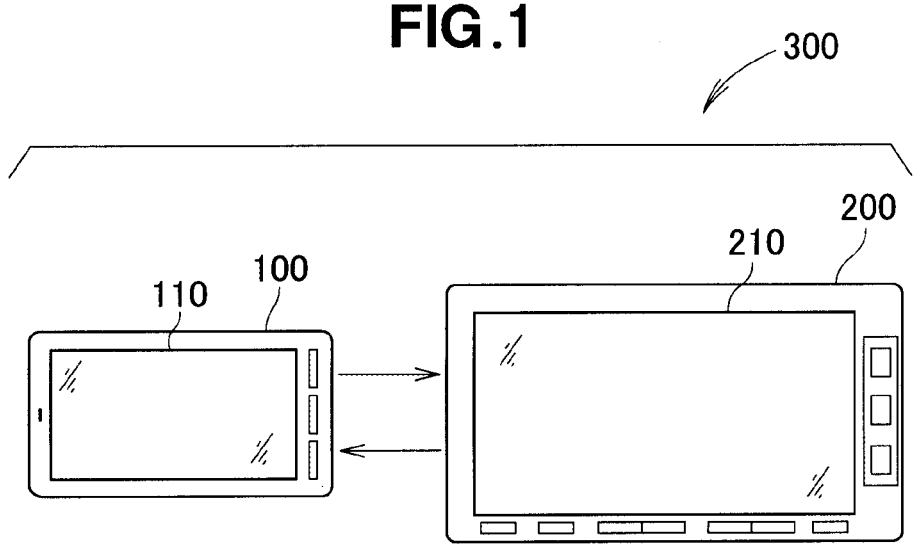
FIG. 1 is a diagrammatical view showing a general configuration of a system according to one embodiment of the present invention.

Referring now to the drawings and FIG. 1 in particular, there is shown a general configuration of a vehicle on-board unit and mobile device linkage system according to an embodiment of the present invention. As shown in FIG. 1, the system 300 generally comprises a mobile device 100 and a vehicle on-board unit 200 that can be linked with each other. More particularly, the mobile device 100 serves as a controller or master, while the vehicle on-board unit 200 serves as an external monitor or slave. The vehicle on-board unit 200 has a display section 210 that can be controlled by executing an application provided on the mobile device 100. In the embodiment shown in FIG. 1, an image shown on a screen of the display section 210 of the vehicle on-board unit 200 represents an image shown on a screen of a display section 110 of the mobile device 100. When the display section 210 is larger in size or pixel density than the display section 110, the image shown on the screen of the display section 110 of the mobile device 100 is enlarged on the side of the display section 210.

In the embodiment shown in FIG. 1, the mobile device 15 is a mobile phone unit (so-called "smartphone", for example) which is linkable with the vehicle on-board unit 200. The mobile device (mobile phone unit) 100 can communicate with a mobile telephone network (and Internet) via a base station, for example. The mobile device 100 does not have to be connectable with the mobile telephone network and may include a portable tablet personal computer, a personal digital assistant (PDA) and another type of portable personal computer. The vehicle on-board unit 200 may include a monitor unit, audio unit, navigation unit and the like. The vehicle on-board unit 200 is installed in a vehicle such as automobile (not shown) and has a display section 210. While the vehicle on-board unit 200 and the mobile device 100 are linked together, the display section 210 of the vehicle on-board unit 200 serves as an external monitor of the mobile device 100.

Figure 2:
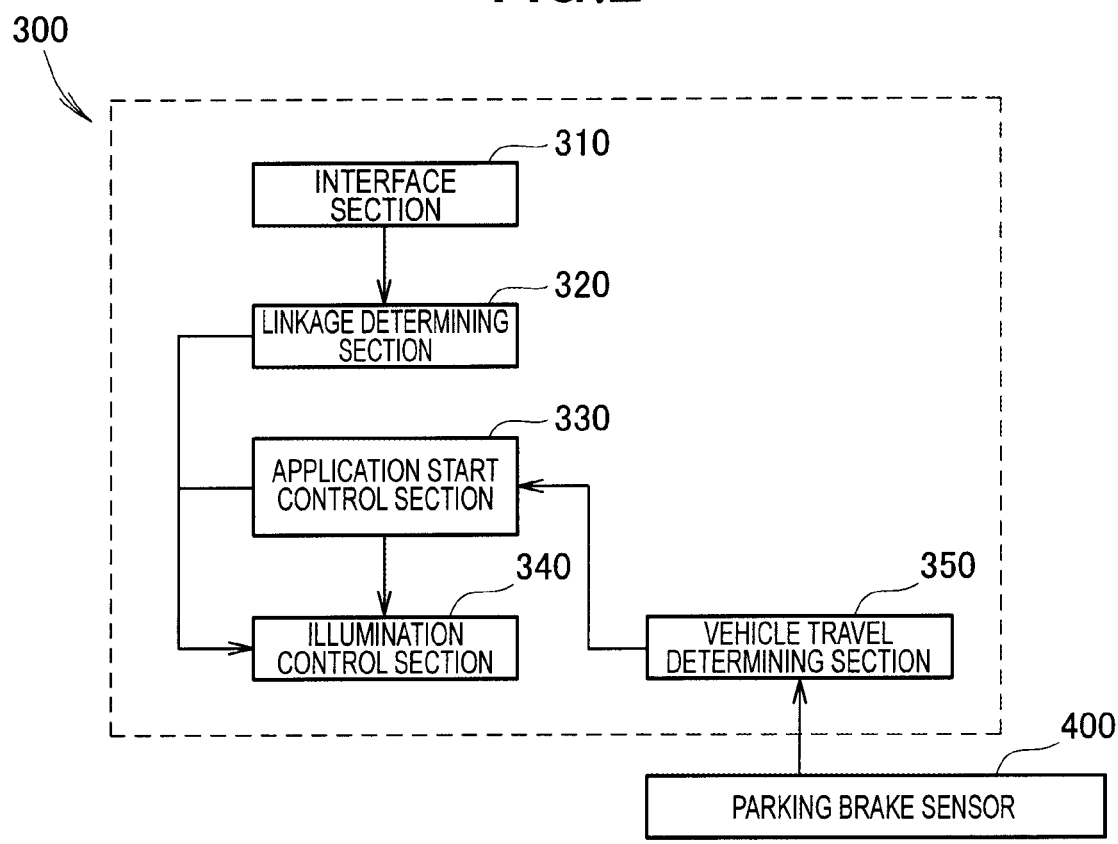
FIG. 2 is a schematic functional block diagram of the system.

FIG. 2 shows in functional block diagram the general configuration of the system 300. As shown in this figure, the system 300 comprises an interface section 310, a linkage determining section 320, an application start control section 330, an illumination control section 340, and a vehicle travel determining section 350. The system 300 may further include another functional section (not shown) to achieve any desired function where appropriate.

The interface section (communication interface section) 310 shown in FIG. 2 is used to allow the mobile device 100 to communicate with the vehicle on-board unit 200 so that the mobile device 100 and the vehicle on-board unit 200 can communicate with each other via the interface section 310. The interface section 310 allows for the exchange of information or data between the mobile device 200 and the vehicle on-board unit 200 by a profile or protocol, such as Bluetooth (registered trademark) or Wifi, used in wireless communication.

The linkage determining section 320 shown in FIG. 2 determines completion of a linkage between the mobile device 100 and the vehicle on-board unit 200 based on information acquired by the interface section 310. More specifically, the linkage determining section 320 determines whether or not the mobile device 100 is serving as a controller or master, and the vehicle on-board unit 200 is serving as an external monitor or slave. Stated in other words, the linkage determining section 320 determines whether or not an external display connection has completed between the mobile device 100 and the vehicle on-board unit 200. The linkage determining section 320 generates a connection signal indicative of completion of the external display connection and delivers the connection signal to the illumination control section 340.

The application start control section 330 shown in FIG. 2 starts or excites a launcher application, which limits use of a registered application (restricted registered application) while the vehicle is moving or in motion. When the vehicle is actually moving or in motion, the launcher application hides an icon of the registered application (restricted registered application) or disables selection of the registered application (restricted registered application). The application start control section 330 generates a start signal indicative of the start-up of the launcher application and delivers the start signal to the illumination control section 340.

In case where the mobile device 100 has a plurality of applications running on an operating system (OS) such as Android, the launcher application can restrict use of some of the plurality of applications. More particularly, the launcher application is able to separate and register the plurality of applications depending on their usability while the vehicle is moving or in motion. Especially, the launcher application may determine whether or not each individual application corresponds to a predetermined recommended application. With this determination, only those applications, which are determined as corresponding to the predetermined recommended application (and classified in a first group of applications), are registered as non-restricted registered applications that can be used while the vehicle is moving or in motion. Other applications, which are determined as not corresponding to the predetermined recommended application (and classified in a second group of applications), are registered as restricted registered applications that are not usable while the vehicle is moving or in motion.

The launcher application may remove restrictions on the restricted registered applications when the vehicle is not moving (namely, when the vehicle is in park).

The illumination control section 340 shown in FIG. 2 is triggered or activated when the launcher application is started and, upon activation, it turns off a screen of the display section 110 of the mobile device 100. In this instance, the illumination control section 340 may perform turn-off control of the screen of the display section 110 depending solely on the presence of a start signal generated by the application start control section 330. It is preferable, however, that the illumination control section 340 relies on the presence of both a connection signal (generated by the linkage determining section 320) and a start signal (generated by the application start control section 330) in performing turn-off control of the screen of the display section 110. The connection signal represents completion of the external display connection, and the start signal represents start-up of the launcher application. Under the condition that the connection signal and the start signal are present, the illumination control section 340 turns off the screen of the display section 110 of the mobile device 100.

The vehicle travel determining section 350 determines as to whether or not the vehicle is moving or in motion, by using, for example, information from a parking brake of the vehicle. More particularly, a parking brake sensor 400 is configured to detect activation and deactivation of the parking brake and generate a signal corresponding to the detected activation or deactivation of the parking brake. For instance, when a detection signal from the parking brake sensor 400 is a low-level signal, the vehicle travel determining section 350 determines that the vehicle is moving or in motion. Alternatively, when a detection signal from the parking brake sensor 400 is a high-level signal, the vehicle state determining section 350 determines that the vehicle is not moving or the vehicle is in park. The parking brake is activated, for example, when a parking brake lever is manually pulled by a driver's hand, or alternatively when a parking brake pedal is depressed by a driver's foot. The parking brake is normally disposed in a deactivated state.

Figure 3A:
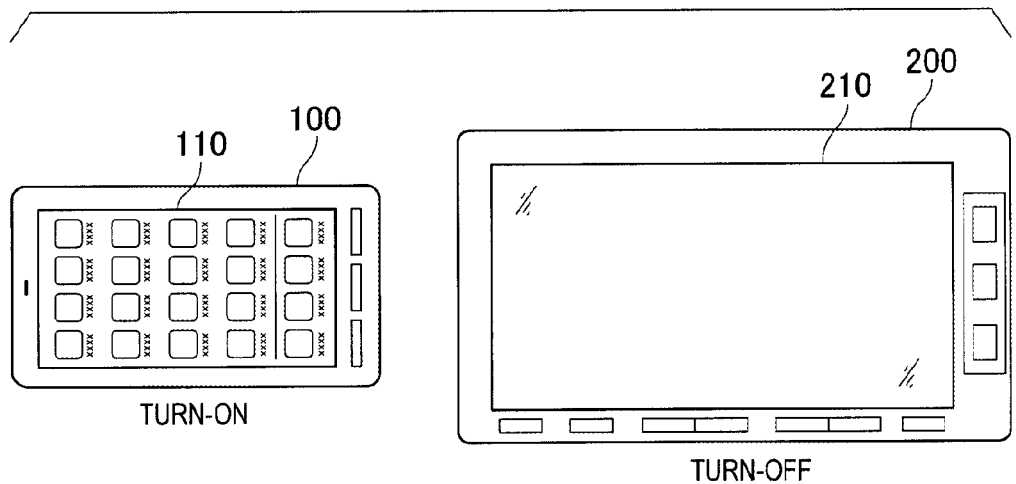
FIG. 3A is a diagrammatical view illustrative of the manner in which applications are displayed when a vehicle on-board unit and a mobile device are not linked.
Figure 3B:
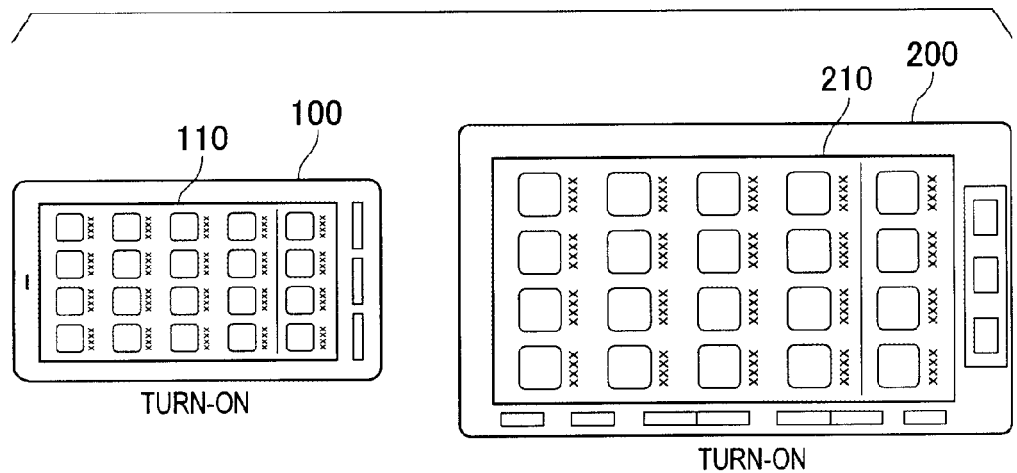
FIG. 3B is a diagrammatical view illustrative of the manner in which the applications are displayed when the vehicle on-board unit and the mobile device are linked together.
Figure 3C:
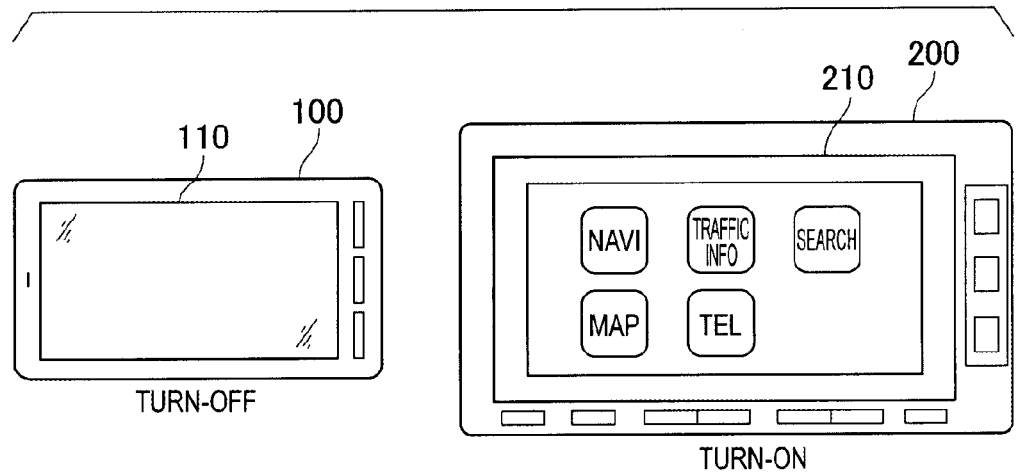
FIG. 3C is a diagrammatical view illustrative of the manner in which the applications are displayed when the vehicle on-board unit and the mobile device are linked and use of registered applications is restricted while the vehicle is moving.

FIG. 3A diagrammatically illustrates the manner in which applications are displayed when the vehicle on-board unit 200 and the mobile device 100 are not linked together. Similarly, FIG. 3B diagrammatically illustrates the manner in which the applications are displayed when the vehicle on-board unit 200 and the mobile device 100 are linked together. Furthermore, FIG. 3C diagrammatically shows the manner in which the applications are displayed when the vehicle on-board unit 200 and the mobile device 100 are linked together and use of some registered applications is restricted due to the vehicle while in motion.

As shown in FIG. 3A, when the vehicle on-board unit 200 and the mobile device 100 are not linked together, a plurality of applications provided on the mobile device 100 is displayed on a screen of the display section 110 in the form of icons. In this condition, the vehicle on-board unit 200 is in a de-energized or OFF state and the display section 210 is turned off. Though not shown, while the vehicle on-board unit 200 is in a non-linked state with respect to the mobile device 100, the vehicle on-board unit 200 may be turned on or energized to thereby activate the display section 210.

As shown in FIG. 3B, when the vehicle on-board unit 200 and the mobile device 100 are linked together, the icons of the applications provided on the mobile device 100 are also displayed on the screen of the display section 210 of the vehicle on-board unit 200. In this instance, the OS application of the mobile device 100 is executed and the display section 110 and the display section 210 are both controlled under operation of the OS application. By the operation of the OS application, a video signal representing a screen of the display section 110 is sent to the vehicle on-board unit 200 through an SPP (Serial Port Profile) for Bluetooth communication, so that the display section 210 of the vehicle on-board unit 200 can serve as an external monitor of the mobile device 100. The screen of the display section 110 is zoomed up or enlarged and forms another or external screen of the display section 210. Thus, the same icons as those of the applications provided on the mobile device 100 are shown on the screen of the display section 210.

In the illustrated embodiment, the display section 110 and the display section 210 are touch panels so that the OS application allows the driver to select an icon of the launcher application with its finger to thereby start up or excite the launcher application. The OS application can receive manual input operation of one or both of the touch panel display sections 110, 210 via a Bluetooth HID (Human Interface Device Profile) to thereby realize a UMI (User-Machine Interface) control.

Furthermore, the OS application may be an application which can recognize voice action commands issued from the driver and allows the driver to start up the launcher application using its voice. Additionally, the OS application may automatically start up the launcher application on condition that the vehicle on-board unit 200 and the mobile device 100 are linked together.

As shown in FIG. 3C, when the launcher application is started, the launcher application causes the display section 110 to turn off its display and, at the same time, if the vehicle is actually in motion, the launcher application also causes the display section 210 to show only those icons of registered applications which correspond to the predetermined recommended applications. The registered applications corresponding to the predetermined recommended applications include, for example, a navigation application which guides the vehicle into a desired destination, a traffic information application which provides traffic information including traffic jam-up information, a map application which provides map information, and a telephone application which can communicate with a mobile phone network.

In the embodiment shown in FIG. 3C, while the vehicle is actually moving or in motion, icons of those registered applications (restricted registered applications), which do not correspond to the predetermined recommended applications, are not displayed on the screen of the display section 210 of the vehicle on-board unit 200. With this arrangement, since the icons of the restricted registered applications do not come to the driver's attention, the driver is allowed to concentrate on driving, leading to safe driving of the vehicle.

The restricted registered applications (i.e., applications which cannot be used while the vehicle is moving or in motion) may include a motion picture application that can play videos on the Internet, a TV application that enables TV reception, a music application that can replay promotion videos on the mobile device 100, and a photo application that can replay picture images like a slide show.

Upon start-up or activation of the launcher application, the screen of the display section 110 is turned off. This arrangement allows the driver to acknowledge the start-up of the launcher application without looking directly at the display section 110 and continue concentrated driving of the vehicle. Furthermore, turn-off of the screen of the display section 110 provides a corresponding reduction in generation of heat from the mobile device 100, which will ensure stable operation of the navigation application on the mobile device 100.

When the launcher application is executed, the display section 210 of the vehicle on-board unit 200 is controlled, for example, by the SPP (Serial Port Profile) for Bluetooth communication. For instance when the navigation application is executed, the display section 210 is controlled by the Bluetooth SPP. The navigation application can receive a destination via the Bluetooth HID (Human Interface Device Profile) and also can transmit a stereo audio signal to, or output the stereo audio signal from, the vehicle on-board unit 200 or a speaker connected to the vehicle on-board unit 200 via an A2DP (Advanced Audio Distribution Profile) for Bluetooth.

The launcher application is preferably such an application which can recognize a vice-activation command from the driver. This arrangement will ensure that the driver can voice-activate the navigation application which has been registered into the launcher application as a predetermined recommended application. Other applications registered as predetermined recommended applications are preferably voice-activation command recognizable applications. With this arrangement, since the driver is allowed to activate the launcher application and/or any of the predetermined recommended applications, operation loads on the driver can be reduced. This may assist the driver in continuing concentrated driving operation, leading to highly safe driving of the vehicle. The mobile device 100 may be connected with the vehicle on-board unit 200 via USB (Universal Serial Bus) connection in which instance the mobile device 100 can receive electric power from a battery connected to the vehicle on-board unit 200.

Figure 4:
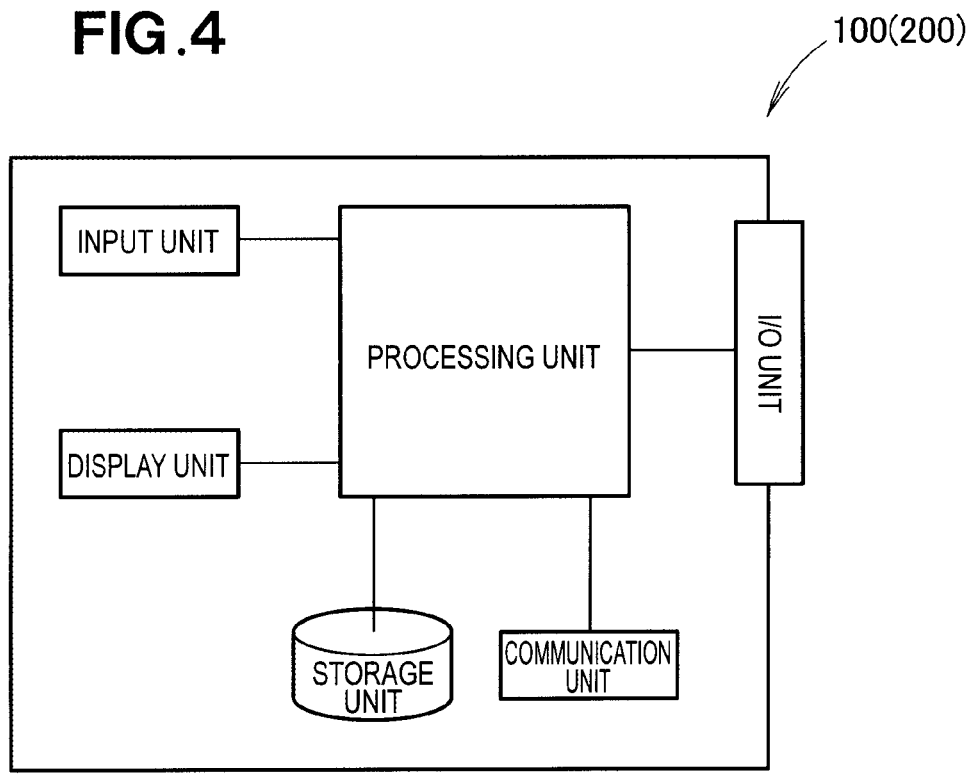
FIG. 4 is a block diagram showing a configuration of hardware of the mobile device shown in FIG. 1.

FIG. 4 is a block diagram showing a configuration of hardware of the mobile device 100 shown in FIG. 1. The vehicle on-board unit 200 shown in FIG. 1 may have the same hardware configuration. The mobile device 100 includes a storage unit, such as a hard disk drive (HDD), flash memory and the like, which can store an OS application and a plurality of applications capable of running on the OS application. The plurality of applications includes the aforesaid launcher application and those applications which can be registered in the launcher application. The latter-mentioned applications include the predetermined recommended applications (i.e., the registered applications that can be used while the vehicle is moving or in motion) and the restricted registered applications (i.e., the registered applications that are not usable while the vehicle is moving or in motion). The applications thus stored in the storage unit can be executed by a processing unit such as a CPU (central processing unit) of a microcomputer. When the OS application is executed, the processing unit of the mobile device 100 operates as the interface section (communication interface) 310, linkage determining section 320, application start control section 330, and illumination control section 340 shown in FIG. 2. When the launcher application is executed, the processing unit of the mobile device 100 operates as a part of the application start control section 330 shown in FIG. 2.

As described above, upon execution of the OS application, the processing unit of the mobile device 100 operate as the illumination control section 340 shown in FIG. 2. When the launcher application and any of the predetermined recommended applications (that can be used while the vehicle is in motion) are executed, the processing unit may operate as a part of the illumination control section 340.

As shown in FIG. 4, the mobile device 100 further includes an input unit and a display unit. The input unit and the display unit may be formed by a single touch screen display panel module. The mobile device 100 also includes a communication unit, which may be formed by a 3G communication module or a Bluetooth communication module. The mobile device 100 further includes an I/O or interface unit, which may be formed by a USB interface module.

The vehicle on-board unit 200 includes a storage unit such a HDD, flash memory and the like. The storage unit is able to store an OS application and at least one application capable of running on the OS application. The storage unit of the vehicle on-board unit 200 can also store information about any one of the predetermined recommended applications. The at least one application includes a linkage recognition application that can recognize completion of a linkage between the vehicle on-board unit 200 and the mobile device 100. Upon recognition of the linkage between the mobile device 100 and the vehicle on-board unit 200, the linkage recognition application receives a video signal from the mobile device 100 and executes linkage or cooperation with the mobile device 100 on condition that the OS application and the launcher application are in an execution status.

The linkage recognition application can transmit information about any of the predetermined recommended applications to the launcher application. The linkage recognition application also can update the information about the predetermined recommended applications. The launcher application classifies and registers the predetermined recommended applications based on the information received from the linkage recognition application and information about the predetermined recommended applications stored in the storage unit of the mobile device 100. With this classified registration, it is possible to prevent use of any application which does not fall in the category of the predetermined recommended applications.

The storage unit of the vehicle on-board unit 200 may further store a vehicle travel determination application. The vehicle travel determination application is configured to determine whether or not the vehicle is actually moving or in motion and transmit a determination result to the launcher application. The thus transmitted determination result enables the launcher application to set the icon of a restricted registered application (which does not correspond to the predetermined recommended applications) into a display state or a non-display or hidden state. These and other applications can be executed by a processing unit such as a CPU of the vehicle on-board unit 200. For example, when the vehicle travel determining application is executed, the processing unit of the vehicle on-board unit 200 operates as the vehicle travel determining section 350 shown in FIG. 2.

The vehicle on-board unit 200 further includes an input unit and a display unit. The input unit and the display unit may be formed by a single touch screen display panel module. The vehicle on-board unit 200 also includes a communication unit, which may be formed by a Bluetooth communication module. The vehicle on-board unit 200 further includes an I/O or interface unit, which may be formed by a USB interface module, a speaker interface module, a microphone interface module, and a parking brake sensor module. The vehicle on-board unit 200 is configured to communicate with a vehicle on-board network such as CAN (Controller Area Network).

As previously described, when the OS application is executed, the processing unit of the mobile device 100 operates as the interface section 310, linkage determining section 320, and application start control section 330 shown in FIG. 2. When the linkage recognition application is executed, the processing unit of the vehicle on-board unit 200 may operate as a part of the interface section 310, a part of the linkage determining section 320, and a part of the application start control section 330. Furthermore, when the vehicle travel determining application is executed, the processing unit of the on-board unit 200 operates as the vehicle travel determining section 350 shown in FIG. 2. Additionally, upon execution of the launcher application, it may be possible for the processing unit of the mobile device 100 to operate as a part of the vehicle travel determining section 350.

The linkage made between the vehicle on-board unit 200 and the mobile device 100 may be a wireless linkage using a protocol such as Bluetooth or Wifi, or alternately a wired linkage. Furthermore, the vehicle on-board unit 200 and the mobile device 100 may be linked together via a relaying apparatus (not shown), in which instance the vehicle on-board unit 200 and the relaying apparatus may be linked by wire, and the relaying apparatus and the mobile device 100 may be wirelessly linked together.

Furthermore, when an image displayed on the display section 110 of the mobile device 100 is also displayed on the display section 210 of the vehicle on-board unit 200, the OS application of the vehicle on-board unit 200 and any of the applications capable of running on this OS application may operate as a client side of a VNC (Virtual Network Computing), while the OS application of the mobile device 100 and any of the applications capable of running on this OS application may operate as a server side of the VNC.

Obviously, various minor changes and modifications of the present invention are possible in light of the above teaching. It is therefore to be understood that within the scope of the appended claims the invention may be practiced otherwise than as specifically described.

What is claimed is:

1. A vehicle on-board unit and mobile device linkage system, comprising:
   an on-board unit installed in a vehicle;
   a mobile device having a display section;
   an interface section that allows communication between the mobile device and the on-board unit;
   a linkage determining section that, on the basis of information obtained by the interface section, determines whether or not the mobile device and the on-board unit are linked together and generates a connection signal indicative of completion of an external display connection;
   a vehicle travel determining section that determines whether or not the vehicle is in motion;
   an application start control section that starts a launcher application provided on the mobile device, and generates a start signal indicative of the start-up of the launcher application, the launcher application being configured to restrict use of a registered application provided on the mobile device while the vehicle is in motion; and
   an illumination control section that turns off a screen of the display section of the mobile device, depending on presence of the connection signal and the start signal delivered by the application start control section to the illumination control section when the launcher application is started.

2. The vehicle on-board unit and mobile device linkage system according to claim 1, wherein the vehicle travel determining section uses information from a parking brake of the vehicle in order to determine whether or not the vehicle is in motion.

3. The vehicle on-board unit and mobile device linkage system according to claim 1, wherein the launcher application is an application capable of recognizing a voice-activation command from a driver of the vehicle.

4. The vehicle on-board unit and mobile device linkage system according to claim 1, wherein the illumination control section operates to turn off the screen of the display section of the mobile device when the launcher application is started under conditions that a linkage between the mobile device and the on-board unit has been determined by the linkage determining section and the vehicle is in a moving state has been determined by the vehicle travel determining section.

* * * * *